(12) United States Patent
Murase et al.

(10) Patent No.: US 12,100,840 B2
(45) Date of Patent: *Sep. 24, 2024

(54) BINDER COMPOSITION FOR NON-AQUEOUS SECONDARY BATTERY ELECTRODE, SLURRY COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Tomoya Murase, Tokyo (JP); Junichi Asano, Tokyo (JP); Fumiaki Bando, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 503 days.

This patent is subject to a terminal disclaimer.

(21) Appl. No.: 17/594,417

(22) PCT Filed: Apr. 17, 2020

(86) PCT No.: PCT/JP2020/016904
§ 371 (c)(1),
(2) Date: Oct. 15, 2021

(87) PCT Pub. No.: WO2020/213721
PCT Pub. Date: Oct. 22, 2020

(65) Prior Publication Data
US 2022/0181631 A1    Jun. 9, 2022

(30) Foreign Application Priority Data
Apr. 18, 2019 (JP) ................. 2019-079512

(51) Int. Cl.
*H01M 10/0569* (2010.01)
*H01M 4/04* (2006.01)
*H01M 4/62* (2006.01)
*H01M 4/02* (2006.01)

(52) U.S. Cl.
CPC ......... *H01M 4/622* (2013.01); *H01M 4/0416* (2013.01); *H01M 10/0569* (2013.01); *H01M 2004/028* (2013.01); *H01M 2300/0051* (2013.01)

(58) Field of Classification Search
CPC ............. H01M 4/622; H01M 4/0416; H01M 10/0569; H01M 2004/028; H01M 2300/0051
See application file for complete search history.

(56) References Cited

U.S. PATENT DOCUMENTS

| | | |
|---|---|---|
| 9,257,703 B2 | 2/2016 | Sekine |
| 10,985,375 B2 | 4/2021 | Annaka et al. |
| 2013/0018287 A1 | 1/2013 | Capelli |
| 2013/0330622 A1 | 12/2013 | Sasaki |
| 2019/0198878 A1* | 6/2019 | Annaka ............... H01M 4/1391 |

FOREIGN PATENT DOCUMENTS

| | | |
|---|---|---|
| CN | 101260172 A | 9/2008 |
| JP | 2012204303 A | 10/2012 |
| JP | 5573966 B2 | 8/2014 |
| JP | 5696664 B2 | 4/2015 |
| JP | 2015080189 A | 4/2015 |
| JP | 2017170250 A | 9/2017 |
| JP | 2018172591 A | 11/2018 |
| WO | 2011040288 A1 | 4/2011 |
| WO | 2012115096 A1 | 8/2012 |
| WO | 2018056083 A1 | 3/2018 |

OTHER PUBLICATIONS

May 19, 2023, the Extended European Search Report issued by the European Patent Office in the corresponding European Patent Application No. 20791744.4.
Sep. 28, 2021, International Preliminary Report on Patentability issued in the International Patent Application No. PCT/JP2020/016904.

* cited by examiner

*Primary Examiner* — Jane J Rhee
(74) *Attorney, Agent, or Firm* — KENJA IP LAW PC

(57) ABSTRACT

A binder composition for a non-aqueous secondary battery electrode contains a polymer A. The polymer A includes a nitrile group-containing monomer unit in a proportion of not less than 80.0 mass % and not more than 99.9 mass %, has a weight-average molecular weight (Mw) of not less than 700,000 and not more than 2,000,000, and has a molecular weight distribution (Mw/Mn) of less than 3.0.

5 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery positive electrode, a positive electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher secondary battery performance.

An electrode used in a secondary battery, such as a lithium ion secondary battery, generally includes a current collector and an electrode mixed material layer formed on the current collector. The electrode mixed material layer is formed, for example, by applying, onto the current collector, a slurry composition in which an electrode active material, a binder-containing binder composition, and so forth are dispersed in a dispersion medium, and drying the applied slurry composition.

In order to further improve the performance of secondary batteries, attempts have been made in recent years to improve binder compositions used in electrode mixed material layer formation.

As one specific example, Patent Literature (PTL) 1 discloses a binder composition containing a polymer that includes a repeating unit derived from a monomer including a nitrile group in a proportion of not less than 80 weight % and not more than 99.9 weight %, that includes a repeating unit derived from an ethylenically unsaturated compound in a proportion of not less than 0.1 weight % and not more than 20 weight %, that has a weight-average molecular weight of 500,000 to 2,000,000, and that has a molecular weight distribution (Mw/Mn) of not less than 3 and not more than 13. According to PTL 1, it is possible to produce an electrode that can cause a secondary battery to display excellent cycle characteristics by using a binder composition that contains the polymer described above.

As another example, PTL 2 discloses a binder for a lithium ion secondary battery electrode containing a block copolymer that does not include a halogen atom and does not include an unsaturated bond in a main chain. The block copolymer includes a segment A that displays compatibility with an electrolyte solution containing ethylene carbonate and diethyl carbonate and a segment B that does not display compatibility with the electrolyte solution. The segment A includes polymerization units based on an acrylic acid alkyl ester in which the alkyl group in the ester group has a carbon number of 1 to 5, a methacrylic acid alkyl ester in which the alkyl group in the ester group has a carbon number of 1 to 5, and/or a carboxy group-containing monomer, whereas the segment B includes polymerization units based on an $\alpha,\beta$-unsaturated nitrile compound, a styrenic monomer, an acrylic acid alkyl ester in which the alkyl group in the ester group has a carbon number of 6 or more, and/or a methacrylic acid alkyl ester in which the alkyl group in the ester group has a carbon number of 6 or more. Note that the weight-average molecular weight of the block copolymer described in PTL 2 is within a range of 1,000 to 500,000. According to PTL 2, it is possible to provide an electrode for a secondary battery used in a lithium ion secondary battery or the like having improved high-temperature characteristics and long-term cycle characteristics by using a binder for a lithium ion secondary battery electrode that contains the block copolymer described above.

CITATION LIST

Patent Literature

PTL 1: JP5573966B2
PTL 2: JP5696664B2

SUMMARY

Technical Problem

However, there has been demand for further improvement of secondary battery performance in recent years, and there is room for improvement of the conventional binder compositions described above in terms of increasing close adherence strength (hereinafter, referred to as "peel strength") of a current collector and an electrode mixed material layer formed using the binder composition while also maintaining secondary battery cycle characteristics well.

Accordingly, one object of the present disclosure is to provide a binder composition for a non-aqueous secondary battery electrode and a slurry composition for a non-aqueous secondary battery positive electrode that can form an electrode mixed material layer having excellent peel strength and can cause a secondary battery to display good cycle characteristics.

Another object of the present disclosure is to provide a positive electrode for a non-aqueous secondary battery that has excellent positive electrode mixed material layer peel strength and can cause a non-aqueous secondary battery to display good cycle characteristics.

Yet another object of the present disclosure is to provide a non-aqueous secondary battery that has excellent battery characteristics such as cycle characteristics.

Solution to Problem

The inventors conducted diligent investigation with the aim of solving the problem set forth above. The inventors discovered that the problem set forth above can be advantageously solved by using a binder composition for a non-aqueous secondary battery electrode containing a polymer A that has a specific chemical composition, weight-average molecular weight, and molecular weight distribution, and, in this manner, the inventors completed the present disclosure.

Specifically, the present disclosure aims to advantageously solve the problem set forth above, and a presently disclosed binder composition for a non-aqueous secondary battery electrode (hereinafter, also referred to simply as a "binder composition") comprises a polymer A, wherein the polymer A includes a nitrile group-containing monomer unit in a proportion of not less than 80.0 mass % and not more than 99.9 mass %, the polymer A has a weight-average molecular weight (Mw) of not less than 700,000 and not more than 2,000,000, and the polymer A has a molecular weight distribution (Mw/Mn) of less than 3.0. By using a binder composition containing a polymer A that includes a nitrile group-containing monomer unit in a proportion of not less than 80.0 mass % and not more than 99.9 mass %, that has a weight-average molecular weight (Mw) of not less than 700,000 and not more than 2,000,000, and that has a molecular weight distribution (Mw/Mn) of less than 3.0 in this manner, it is possible to form an electrode mixed material layer having excellent peel strength and to cause a secondary battery to display good cycle characteristics.

The phrase "includes a monomer unit" as used with respect to a polymer in the present disclosure means that "a polymer obtained with the monomer includes a structural unit derived from the monomer unit". Note that the "proportional content" of each "monomer unit" referred to in the present disclosure can be measured using a nuclear magnetic resonance (NMR) method such as $^1$H-NMR.

Moreover, the term "molecular weight distribution (Mw/Mn)" as used in the present disclosure refers to the ratio of weight-average molecular weight (Mw) relative to number-average molecular weight (Mn). Note that the "weight-average molecular weight" and the "molecular weight distribution" of a polymer referred to in the present disclosure can be measured using a method described in the EXAMPLES section of the present specification.

In the presently disclosed binder composition for a non-aqueous secondary battery electrode, the polymer A preferably has a degree of swelling in electrolyte solution of not less than 120 mass % and not more than 250 mass %. Note that the degree of swelling in electrolyte solution is calculated by (W1/W0)×100 using the mass W0 of a test specimen produced by drying an N-methyl-2-pyrrolidone (hereinafter, also referred to as "NMP") dispersion of the polymer A under conditions of 2 hours at a temperature of 120° C. and the mass W1 of the test specimen after 72 hours of immersion in electrolyte solution at a temperature of 60° C., and the electrolyte solution is a solution in which $LiPF_6$ is dissolved in a concentration of 1.0 mol/L in a mixed solvent of ethylene carbonate and ethyl methyl carbonate (volume mixing ratio: ethylene carbonate/ethyl methyl carbonate=3/7). Through the degree of swelling in electrolyte solution of the polymer A being within the range set forth above, it is possible to form an electrode mixed material layer having improved peel strength and to suppress an increase of internal resistance of a secondary battery.

In the presently disclosed binder composition for a non-aqueous secondary battery electrode, the polymer A preferably further includes either or both of a carboxy group-containing monomer unit and a (meth)acrylic acid ester monomer unit. When the polymer A includes either or both of a carboxy group-containing monomer unit and a (meth) acrylic acid ester monomer unit, the peel strength of an electrode mixed material layer can be further improved.

In the present specification, "(meth)acryl" is used to indicate "acryl" and/or "methacryl".

Moreover, the present disclosure aims to advantageously solve the problem set forth above, and a presently disclosed slurry composition for a non-aqueous secondary battery positive electrode (hereinafter, also referred to simply as a "slurry composition") comprises: a positive electrode active material; a conductive material; and any one of the binder compositions for a non-aqueous secondary battery electrode set forth above. By using a slurry composition that contains a positive electrode active material, a conductive material, and any one of the binder compositions set forth above in this manner, it is possible to form an electrode mixed material layer having excellent peel strength and to cause a non-aqueous secondary battery to display good cycle characteristics.

Furthermore, the present disclosure aims to advantageously solve the problem set forth above, and a presently disclosed positive electrode for a non-aqueous secondary battery comprises a positive electrode mixed material layer formed using the slurry composition for a non-aqueous secondary battery positive electrode set forth above. By using the slurry composition set forth above, it is possible to obtain a positive electrode for a non-aqueous secondary battery that includes a positive electrode mixed material layer having excellent peel strength and that can cause a secondary battery to display good cycle characteristics.

Also, the present disclosure aims to advantageously solve the problem set forth above, and a presently disclosed non-aqueous secondary battery comprises a positive electrode, a negative electrode, a separator, and an electrolyte solution, wherein the positive electrode is the positive electrode for a non-aqueous secondary battery set forth above. By using the positive electrode for a non-aqueous secondary battery set forth above in this manner, it is possible to obtain a secondary battery that has excellent battery characteristics such as cycle characteristics.

Advantageous Effect

According to the present disclosure, it is possible to provide a binder composition for a non-aqueous secondary battery electrode and a slurry composition for a non-aqueous secondary battery positive electrode that can form an electrode mixed material layer having excellent peel strength and can cause a secondary battery to display good cycle characteristics.

Moreover, according to the present disclosure, it is possible to provide a positive electrode for a non-aqueous secondary battery that has excellent positive electrode mixed material layer peel strength and can cause a non-aqueous secondary battery to display good cycle characteristics.

Furthermore, according to the present disclosure, it is possible to provide a non-aqueous secondary battery that has excellent battery characteristics such as cycle characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, the presently disclosed binder composition for a non-aqueous secondary battery electrode can suitably be used, in particular, in production of the presently disclosed slurry composition for a non-aqueous secondary battery positive electrode.

Furthermore, the presently disclosed slurry composition for a non-aqueous secondary battery positive electrode can be used in production of a positive electrode of a non-aqueous secondary battery such as a lithium ion secondary battery.

The presently disclosed non-aqueous secondary battery includes a positive electrode for a non-aqueous secondary battery that has been formed using the presently disclosed slurry composition for a non-aqueous secondary battery positive electrode.

(Binder Composition for Non-Aqueous Secondary Battery Electrode)

The presently disclosed binder composition for a non-aqueous secondary battery electrode contains a polymer A and optionally further contains a solvent and other components that can be contained in an electrode of a secondary battery.

Features of the polymer A in the presently disclosed binder composition are that (i) the polymer A includes a nitrile group-containing monomer unit in a proportion of not less than 80.0 mass % and not more than 99.9 mass %, (ii) the polymer A has a weight-average molecular weight (Mw) of not less than 700,000 and not more than 2,000,000, and (iii) the polymer A has a molecular weight distribution (Mw/Mn) of less than 3.0.

By using the presently disclosed binder composition, it is possible to form an electrode mixed material layer having excellent peel strength and to cause a secondary battery to display good cycle characteristics.

<Polymer A>

The polymer A is a component that, in an electrode produced by forming an electrode mixed material layer on a current collector using a slurry composition that is produced using the binder composition, holds components contained in the electrode mixed material layer so that the components do not detach from the electrode mixed material layer (i.e., functions as a binder).

[Chemical Composition of Polymer A]

The polymer A is required to include a nitrile group-containing monomer unit as a repeating unit in the specific proportion set forth above. The polymer A preferably further includes either or both of a carboxy group-containing monomer unit and a (meth)acrylic acid ester monomer unit as a repeating unit, and can optionally further include other monomer units besides those mentioned above.

—Nitrile Group-Containing Monomer Unit—

The nitrile group-containing monomer unit is a repeating unit that is derived from a nitrile group-containing monomer. The inclusion of the nitrile group-containing monomer unit in the polymer A makes it possible to provide an electrode mixed material layer that is formed using the binder composition with excellent peel strength.

Examples of nitrile-group containing monomers that can form the nitrile group-containing monomer unit include α,β-ethylenically unsaturated nitrile monomers. Specifically, any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethyl acrylonitrile.

Of these examples, acrylonitrile and methacrylonitrile are preferable from a viewpoint that a positive electrode mixed material layer having excellent peel strength can be formed, with acrylonitrile being more preferable.

Note that one nitrile group-containing monomer may be used individually, or two or more nitrile group-containing monomers may be used in combination in a freely selected ratio.

The proportional content of the nitrile group-containing monomer unit in the polymer A when all repeating units included in the polymer A are taken to be 100.0 mass % is required to be 80.0 mass % or more, and is preferably 82.0 mass % or more, and more preferably 85.0 mass % or more. Moreover, the proportional content of the nitrile group-containing monomer unit is required to be 99.9 mass % or less, and is preferably 95.0 mass % or less. When the proportional content of the nitrile group-containing monomer unit in the polymer A is not less than any of the lower limits set forth above, an increase of secondary battery internal resistance due to excessive swelling of the polymer A in electrolyte solution can be suppressed, and secondary battery cycle characteristics and high-temperature storage characteristics can be maintained well. On the other hand, when the proportional content of the nitrile group-containing monomer unit in the polymer A is not more than any of the upper limits set forth above, flexibility of the polymer A can be ensured, pressability during electrode production can be improved, and electrode density can be increased.

—Carboxy Group-Containing Monomer Unit—

The carboxy group-containing monomer unit is a repeating unit that is derived from a carboxy group-containing monomer. The inclusion of the carboxy group-containing monomer unit in the polymer A makes it possible to improve the peel strength of an electrode mixed material layer that is formed using the binder composition.

Examples of carboxy group-containing monomers that can form the carboxy group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group through hydrolysis can also be used as a carboxy group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Of these examples, acrylic acid, methacrylic acid, and itaconic acid are preferable as carboxy group-containing monomers, and methacrylic acid is more preferable as a carboxy group-containing monomer.

Note that one carboxy group-containing monomer may be used individually, or two or more carboxy group-containing monomers may be used in combination in a freely selected ratio.

The proportional content of the carboxy group-containing monomer unit in the polymer A when all repeating units included in the polymer A are taken to be 100.0 mass % is preferably 0.1 mass % or more, and more preferably 1.0 mass % or more, and is preferably 10.0 mass % or less, and more preferably 5.0 mass % or less. When the proportional content of the carboxy group-containing monomer unit in the polymer A is within any of the ranges set forth above, the peel strength of an electrode mixed material layer can be improved well.

—(Meth)Acrylic Acid Ester Monomer Unit—

The (meth)acrylic acid ester monomer unit is a repeating unit that is derived from a (meth)acrylic acid ester monomer. The inclusion of the (meth)acrylic acid ester monomer unit in the polymer A makes it possible to further improve the peel strength of an electrode mixed material layer that is formed using the binder composition and to also impart flexibility to the electrode mixed material layer.

Examples of (meth)acrylic acid ester monomers that can form the (meth)acrylic acid ester monomer unit include acrylic acid esters such as methyl acrylate, ethyl acrylate, n-propyl acrylate, isopropyl acrylate, butyl acrylate (n-butyl acrylate, t-butyl acrylate, etc.), pentyl acrylate, hexyl acrylate, heptyl acrylate, octyl acrylate (2-ethylhexyl acrylate, etc.), nonyl acrylate, decyl acrylate, lauryl acrylate, n-tetradecyl acrylate, stearyl acrylate, cyclohexyl cycloacrylate, and β-hydroxyethyl acrylate; and methacrylic acid alkyl esters such as methyl methacrylate, ethyl methacrylate, n-propyl methacrylate, isopropyl methacrylate, butyl methacrylate (n-butyl methacrylate, t-butyl methacrylate, etc.), pentyl methacrylate, hexyl methacrylate, heptyl methacrylate, octyl methacrylate (2-ethylhexyl methacrylate, etc.), nonyl methacrylate, decyl methacrylate, lauryl methacrylate, n-tetradecyl methacrylate, and stearyl methacrylate.

Of these examples, those in which an alkyl group bonded to a non-carbonyl oxygen atom has a carbon number of 8 or less are preferable as (meth)acrylic acid ester monomers from a viewpoint of improving output characteristics and cycle characteristics of a secondary battery, with those in which an alkyl group bonded to a non-carbonyl oxygen atom has a carbon number of 4 or less being more preferable as (meth)acrylic acid ester monomers.

Note that one (meth)acrylic acid ester monomer may be used individually, or two or more (meth)acrylic acid ester monomers may be used in combination in a freely selected ratio.

The proportional content of the (meth)acrylic acid ester monomer unit in the polymer A when all repeating units included in the polymer A are taken to be 100.0 mass % is preferably 1.0 mass % or more, and more preferably 4.0 mass % or more, and is preferably 20.0 mass % or less, and more preferably 10.0 mass % or less. When the proportional content of the (meth)acrylic acid ester monomer unit in the polymer A is within any of the ranges set forth above, the peel strength of an electrode mixed material layer can be further improved.

—Other Monomer Units—

The other monomer units are repeating units that are derived from monomers other than the nitrile group-containing monomers, carboxy group-containing monomers, and (meth)acrylic acid ester monomers described above. Examples of other monomer units that can be included in the polymer A include, but are not specifically limited to, an aromatic vinyl monomer unit, a cross-linkable monomer unit, and a (meth)acrylamide monomer unit.

In the present specification, "(meth)acrylamide" is used to indicate "acrylamide" and/or "methacrylamide".

Note that one other monomer may be used individually, or two or more other monomers may be used in combination in a freely selected ratio.

—Aromatic Vinyl Monomer Unit—

Examples of aromatic vinyl monomers that can form the aromatic vinyl monomer unit include styrene, α-methylstyrene, vinyltoluene, and divinylbenzene.

Note that one aromatic vinyl monomer may be used individually, or two or more aromatic vinyl monomers may be used in combination in a freely selected ratio.

—Cross-Linkable Monomer Unit—

The cross-linkable monomer unit is a monomer unit that is derived from a monomer including a cross-linkable group. The inclusion of the cross-linkable monomer unit makes it possible to increase the cross-link density of the polymer A and reduce the degree of swelling in electrolyte solution of the polymer A through a small amount thereof, and, as a result, makes it possible to improve life characteristics of an obtained secondary battery.

A compound that includes a thermally cross-linkable group in a monofunctional monomer having one olefinic double bond is preferable as a cross-linkable monomer that can form the cross-linkable monomer unit, and examples thereof include monomers including at least one selected from the group consisting of an epoxy group, an oxetanyl group, and an oxazoline group. Of these examples, monomers that include an epoxy group are preferable in terms of ease of cross-linking and cross-link density adjustment.

Examples of monomers that include an epoxy group include monomers that include a carbon-carbon double bond and an epoxy group and monomers that include a halogen atom and an epoxy group.

Examples of monomers that include a carbon-carbon double bond and an epoxy group include vinyl glycidyl ether, allyl glycidyl ether, and glycidyl esters of unsaturated carboxylic acids such as glycidyl acrylate and glycidyl methacrylate. One of these monomers may be used individually, or two or more of these monomers may be used in combination in a freely selected ratio.

—(Meth)Acrylamide Monomer Unit—

Examples of (meth)acrylamide monomers that can form the (meth)acrylamide monomer unit include acrylamide, methacrylamide, diethylacrylamide, and dimethylmethacrylamide.

Note that one (meth)acrylamide monomer may be used individually, or two or more (meth)acrylamide monomers may be used in combination in a freely selected ratio.

The proportional content of other monomer units in the polymer A when all repeating units included in the polymer A are taken to be 100.0 mass % can, for example, be set as not less than 0.1 mass % and not more than 20.0 mass %, and may be 0 mass %.

[Weight-Average Molecular Weight (Mw)]

The weight-average molecular weight (Mw) of the polymer A is required to be 700,000 or more, and is preferably 1,000,000 or more. Moreover, the weight-average molecular weight (Mw) of the polymer A is required to be 2,000,000 or less, and is preferably 1,800,000 or less, and more preferably 1,500,000 or less. Through the weight-average molecular weight (Mw) of the polymer A being not less than any of the lower limits set forth above, it is possible to inhibit sedimentation of solid content contained in a slurry composition when the binder composition is used to produce a slurry composition and to form an electrode mixed material layer having excellent peel strength. On the other hand, through the weight-average molecular weight (Mw) of the polymer A being not more than any of the upper limits set forth above, it is possible to achieve a more uniform electrode mixed material layer thickness and to form an electrode mixed material layer having excellent peel strength because a slurry composition obtained using the binder composition is not excessively thickened.

Note that the weight-average molecular weight of the polymer A can be adjusted by, for example, altering the production method of the polymer A (amount of polymerization initiator, etc.).

[Molecular Weight Distribution (Mw/Mn)]

The molecular weight distribution (Mw/Mn) of the polymer A is required to be less than 3.0, and is preferably less than 2.7, more preferably less than 2.5, and even more preferably less than 2.0. Through the molecular weight distribution (Mw/Mn) of the polymer A being less than 3.0, it is possible to increase close adherence of an electrode mixed material layer and a current collector surface because there are fewer low molecular weight components in the binder composition, and, as a result, it is possible to provide the electrode mixed material layer with excellent peel strength. In addition, it is possible to provide a secondary battery with excellent high-temperature storage characteristics, which is presumed to be because a rise in viscosity of electrolyte solution can be inhibited due to the amount of low molecular weight components that impede movement of an electrode active material being restricted.

Note that although no specific limitations are placed on the lower limit for the molecular weight distribution (Mw/Mn) of the polymer A, the molecular weight distribution (Mw/Mn) of the polymer A is normally more than 1.

The molecular weight distribution (Mw/Mn) of the polymer A can be adjusted by, for example, altering the production method of the polymer A.

Specifically, a polymer A having a small value for the molecular weight distribution (Mw/Mn) can be obtained by adopting living radical polymerization described further below in production of the polymer A.

[Degree of Swelling in Electrolyte Solution]

The degree of swelling in electrolyte solution of the polymer A is preferably 120 mass % or more, and more preferably 150 mass % or more, and is preferably 250 mass % or less, and more preferably 200 mass % or less. Through the degree of swelling in electrolyte solution being not less than any of the lower limits set forth above, it is easier to dissolve the polymer A in NMP. Consequently, the slurry stability of a slurry composition produced using the binder composition improves, which makes it possible to form an electrode mixed material layer having even further improved peel strength. On the other hand, through the degree of swelling in electrolyte solution of the polymer A being not more than any of the upper limits set forth above, the polymer A has a lower tendency to swell in electrolyte solution. Consequently, electrode swelling caused by swelling of the polymer A can be inhibited in a secondary battery produced using the binder composition, and, as a result, an increase of internal resistance of the secondary battery can be suppressed.

Note that the degree of swelling in electrolyte solution of the polymer A can be adjusted by, for example, altering the types and/or ratio of monomers used to produce the polymer A.

[Production Method of Polymer A]

No specific limitations are placed on the method by which the polymer A is produced. For example, the polymer A can be obtained by polymerizing a monomer composition that contains the monomers described above.

The proportional content of each monomer in the monomer composition can be set in accordance with the proportional content of each monomer unit in the polymer A.

The method of polymerization is not specifically limited and may be any of solution polymerization, suspension polymerization, bulk polymerization, emulsion polymerization, or the like, for example. Examples of types of polymerization reactions that can be used include ionic polymerization, radical polymerization, and living radical polymerization. The polymerization can be carried out with a commonly used emulsifier, dispersant, polymerization initiator, chain transfer agent, or the like.

The following describes, as one example, a method of producing the polymer A set forth above through a living radical polymerization reaction. However, the production method of the polymer A is not limited to the example described below.

—Production of Polymer a by Living Radical Polymerization—

In production of the polymer A by living radical polymerization, it is preferable to use a RAFT compound or an organotellurium compound as a polymerization initiator during polymerization of a monomer composition that contains the monomers described above. Note that an azo polymerization initiator may optionally be used in combination with an organotellurium compound in the polymerization. The combined use of an azo polymerization initiator can promote the living radical polymerization reaction. Living radical polymerization makes it easy to control the molecular weight distribution of the polymer A, and thus enables efficient production of the polymer A, which is required to have a molecular weight distribution value of less than 3.0.

—Raft Compound—

Examples of RAFT compounds (reversible addition-fragmentation chain transfer (RAFT) type radical polymerization compounds) that can be used in the living radical polymerization include those described in WO2011/040288A1. Note that the RAFT compound is represented by the following general formula (I).

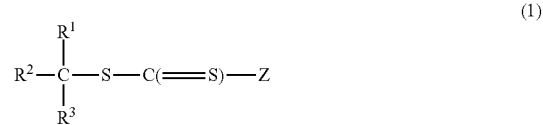

(1)

In formula (I), $R^1$ and $R^2$ are at least one selected from the group consisting of a hydrogen atom, an alkyl group having a carbon number of 1 to 12, and a phenyl group, $R^3$ is at least one selected from the group consisting of a hydrogen atom, an alkyl group having a carbon number of 1 to 12, a phenyl group, a $C(=O)OR^4$ group, a $C(=O)R^4$ group, a halogen group, a cyano group, and a nitro group, where $R^4$ is a hydrogen atom or an alkyl group having a carbon number of 1 to 12, and Z is at least one selected from the group consisting of $SR^5$, $OR^5$, an alkyl group having a carbon number of 1 to 12, an aralkyl group having a carbon number of 7 to 12, and a phenyl group, where $R^5$ is an alkyl group having a carbon number of 1 to 12, an aralkyl group having a carbon number of 7 to 12, or a phenyl group.

—Organotellurium Compound—

Examples of organotellurium compounds that can be used in the living radical polymerization include those described in JP2018-172591A, JP2017-170250A1, and JP2015-080189A1.

Specific examples of organotellurium compounds that can be used include 3-methyltellanyl-1-propene, 3-methyltellanyl-2-methyl-1-propene, 3-methyltellanyl-2-phenyl-1-propene, 3-methyltellanyl-3-methyl-1-propene, 3-methyltellanyl-3-phenyl-1-propene, 3-methyltellanyl-3-cyclohexyl-1-propene, 3-methyltellanyl-3-cyano-1-propene, 3-ethyltellanyl-1-propene, 3-methyltellanyl-3-dimethylaminocarbonyl-1-propene, 3-[(n-propyl)tellanyl]-1-propene, 3-isopropyltellanyl-1-propene, 3-(n-butyl)tellanylpropene, 3-[(n-hexyl)tellanyl]-1-propene, 3-phenyltellanyl-1-propene, 3-[(p-methylphenyl)tellanyl]-1-propene, 3-cyclohexyltellanyl-1-propene, 3-[(2-pyridyl)tellanyl]-1-propene, 3-methyltellanyl-2-butene, 3-methyltellanyl-1-cyclopentene, 3-methyltellanyl-1-cyclohexene, 3-methyltellanyl-1-cyclooctene, 3-ethyltellanyl-1-cyclohexene, 3-methyltellanyl-1-cyclohexene, 3-[(n-propyl)tellanyl]-1-cyclohexene, 3-[(n-butyl)tellanyl]-1-cyclohexene, methyl 2-(methyltellanylmethyl)acrylate, ethyl 2-(methyltellanylmethyl)acrylate, n-butyl 2-(methyltellanylmethyl)acrylate, methyl 2-(ethyltellanylmethyl)acrylate, methyl 2-[(n-butyl)tellanylmethyl]acrylate, methyl 2-(cyclohexyltellanylmethyl)acrylate, 1,4-bis(methyltellanyl)-2-butene, 1,4-bis(ethyltellanyl)-2-butene, 1,4-bis[(n-butyl)tellanyl]-2-butene, 1,4-bis(cyclohexyltellanyl)-2-butene, 1,4-bis(phenyltellanyl)-2-butene, (methyltellanylmethyl)benzene, (methyltellanylmethyl)naphthalene, ethyl-2-methyl-2-methyltellanyl-propionate, ethyl-2-methyl-2-n-butyltellanyl-propionate, (2-trimethyl siloxyethyl)-2-methyl-2-methyltellanyl-propionate, (2-hydroxyethyl)-2-methyl-2-methyltellanyl-propionate, (3-trimethyl silylpropargyl)-2-methyl-2-methyltellanyl-propionate, 2-methyltellanyl-isobutyrate, and ethyl 2-(methyltellanyl)isobutyrate.

One of these organotellurium compounds may be used individually, or two or more of these organotellurium compounds may be used as a mixture in a freely selected ratio.

[Azo Polymerization Initiator]

Any azo polymerization initiator that is used in normal radical polymerization can be used without any specific limitations, and specific examples thereof include 2,2'-azobis(isobutyronitrile), 2,2'-azobis(2-methylbutyronitrile), 2,2'-azobis(2,4-dimethylvaleronitrile), 1,1'-azobis(1-cyclohexanecarbonitrile), dimethyl-2,2'-azobisisobutyrate, 4,4'-azobis(4-cyanovaleric acid), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2-methylamidinopropane) dihydrochloride, 2,2'-azobis[2-(2-imidazolin-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

One of these azo polymerization initiators may be used individually, or two or more of these azo polymerization initiators may be used as a mixture in a freely selected ratio.

Although no specific limitations are placed on the amount of polymerization initiator that is used, normally, the amount of the polymerization initiator relative to 100 parts by mass of monomers used in polymerization is preferably 0.01 mol or more, and more preferably 0.05 mol or more, and is preferably 1 mol or less, and more preferably 0.5 mol or less.

Moreover, although no specific limitations are placed on the amount of azo polymerization initiator that is used in a case in which an azo polymerization initiator is used in combination, normally, the amount of the azo polymerization initiator relative to 1 mol of the organotellurium compound is preferably 1 mol or more, and more preferably 2 mol or more, and is preferably 10 mol or less, and more preferably 5 mol or less.

Note that a solvent may or may not be used in the polymerization reaction. In a case in which a solvent is used, the used solvent may be the subsequently described organic solvent that can optionally be contained in the binder composition, for example, but is not specifically limited thereto.

The polymerization temperature is not specifically limited but is normally 0° C. to 100° C., and preferably 20° C. to 80° C. The polymerization time is also not specifically limited but is normally 1 minute to 96 hours.

<Solvent>

The solvent that can optionally be contained in the binder composition may be an aqueous solvent or an organic solvent that is used in production of the previously described polymer A. Examples of organic solvents that can be used include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide polar organic solvents such as N,N-dimethylformamide and N-methyl-2-pyrrolidone (NMP); aromatic hydrocarbons such as toluene, xylene, chlorobenzene, orthodichlorobenzene, and paradichlorobenzene; and sulfur-containing compounds such as dimethyl sulfoxide.

Note that one solvent may be used individually, or two or more solvents may be used as a mixture.

<Other Components>

Other than the components set forth above, the presently disclosed binder composition may contain components such as a reinforcing material, a leveling agent, a viscosity modifier, and an additive for electrolyte solution. These other components are not specifically limited so long as they do not affect battery reactions and may be selected from commonly known components such as those described in WO2012/115096A1, for example. One of these components may be used individually, or two or more of these components may be used in combination in a freely selected ratio.

The amount of low molecular weight components (for example, surfactants, preservatives, defoamers, etc.) contained in the binder composition is preferably 0.01 mass % or less, and more preferably 0.005 mass % or less when the mass of the entire binder composition is taken to be 100 mass %. Through the amount of low molecular weight components contained in the binder composition being 0.01 mass % or less, it is possible to further increase close adherence of an electrode mixed material layer and a current collector surface, and, as a result, the electrode mixed material layer can be provided with even better peel strength.

<Production of Binder Composition>

The presently disclosed binder composition can be produced by mixing the previously described polymer A, the solvent, and other components by a known method.

(Slurry Composition for Non-Aqueous Secondary Battery Positive Electrode)

The presently disclosed slurry composition for a non-aqueous secondary battery positive electrode contains a positive electrode active material, a conductive material, and the binder composition set forth above, and optionally further contains a polymer B and other components. As a result of the presently disclosed slurry composition containing the binder composition set forth above, a positive electrode mixed material layer that is formed using the presently disclosed slurry composition has excellent peel strength and can cause a secondary battery to display good cycle characteristics.

Although the following describes, as one example, a case in which the presently disclosed slurry composition is a slurry composition for a lithium ion secondary battery positive electrode, the presently disclosed slurry composition is not limited to the following example.

<Positive Electrode Active Material>

The positive electrode active material is a material that gives and receives electrons in a positive electrode of a secondary battery. A material that can occlude and release lithium is normally used as a positive electrode active material for a lithium ion secondary battery.

Specifically, the positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(CoMnNi)O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, or $LiNi_{0.5}Mn_{1.5}O_4$ without any specific limitations.

Note that one positive electrode active material may be used individually, or two or more positive electrode active materials may be used in combination in a freely selected ratio.

From a viewpoint of increasing the capacity of a lithium ion secondary battery, the positive electrode active material is preferably what is referred to as a high-nickel lithium-containing complex oxide that has a high Ni content (for example, a lithium-containing complex oxide of Co—Ni—Mn, a lithium-containing complex oxide of Ni—Mn—Al, a lithium-containing complex oxide of Ni—Co—Al, a $Li_2MnO_3$—$LiNiO_2$-based solid solution, $Li[Ni_{0.17}Li_{0.2}Co_{0.07}Mn_{0.6}]O_2$, or $LiNi_{0.5}Mn_{1.5}O_4$).

Note that in a case in which a high-nickel lithium-containing complex oxide is used as a positive electrode active material, gelation of a slurry composition tends to occur more easily due to increased basicity of the slurry composition. However, according to the present disclosure, even in a case in which a high-nickel lithium-containing complex oxide is used as the positive electrode active material, the high-nickel lithium-containing complex oxide is coated by the polymer A as a consequence of the slurry composition being produced using a binder composition that contains the polymer A. This makes it possible to suppress an increase of basicity of the slurry composition and to prevent gelation of the slurry composition. Accordingly, the presently disclosed slurry composition can be used to efficiently form a positive electrode mixed material layer having excellent peel strength even in a case in which a high-nickel lithium-containing complex oxide is used as the positive electrode active material.

The proportional content of the positive electrode active material in the slurry composition when all solid content in the slurry composition is taken to be 100 mass % is preferably 94 mass % or more, and is preferably 99 mass % or less. A proportional content of the positive electrode active material in the slurry composition that is within the range set forth above enables good improvement of secondary battery capacity.

<Conductive Material>

The conductive material is for ensuring electrical contact among the positive electrode active material. Any known conductive material can be used as the conductive material without any specific limitations.

From a viewpoint of improving electrical conductivity, it is preferable that the presently disclosed slurry composition contains carbon nanotubes (hereinafter, abbreviated as "CNTs"), which are a fibrous carbon material, as the conductive material. The CNTs may be single-walled or multiwalled carbon nanotubes. The specific surface area of the CNTs is preferably 50 $m^2$/g or more, more preferably 70 $m^2$/g or more, and even more preferably 100 $m^2$/g or more, and is preferably 400 $m^2$/g or less, more preferably 350 $m^2$/g or less, and even more preferably 300 $m^2$/g or less. When the specific surface area of the CNTs is within any of the ranges set forth above, good dispersion of the CNTs in the slurry composition can be ensured, and the viscosity of the slurry composition can be stabilized. Note that the term "specific surface area" as used in the present disclosure refers to nitrogen adsorption specific surface area measured by the BET method.

Examples of conductive materials other than CNTs that may be further contained include conductive carbon materials such as carbon black (for example, acetylene black, Ketjenblack® (Ketjenblack is a registered trademark in Japan, other countries, or both), and furnace black), carbon nanohorns, milled carbon fiber obtained by pyrolyzing and subsequently pulverizing polymer fiber, single-layer and multilayer graphene, and carbon non-woven fabric sheet obtained by pyrolyzing non-woven fabric formed of polymer fiber; and fibers and foils of various metals. From a viewpoint of further improving electrical conductivity, the presently disclosed slurry composition preferably contains both CNTs and carbon black as the conductive material, and more preferably contains both CNTs and acetylene black as the conductive material.

Note that one conductive material may be used individually, or two or more conductive materials may be used in combination in a freely selected ratio. In a case in which both CNTs and carbon black are used as the conductive material, the mixing ratio of the CNTs and carbon black (CNTs:carbon black), as a mass ratio, is preferably 1:5 to 5:1, and more preferably 1:1 to 2:1.

The proportional content of the conductive material in the slurry composition when all solid content in the slurry composition is taken to be 100 mass % is preferably 0.1 mass % or more, more preferably 0.5 mass % or more, and even more preferably 1.0 mass % or more, and is preferably 5.0 mass % or less, and more preferably 3.0 mass % or less. By setting the proportional content of the conductive material as not less than any of the lower limits set forth above, it is possible to sufficiently ensure electrical contact among the positive electrode active material. On the other hand, by setting the proportional content of the conductive material as not more than any of the upper limits set forth above, it is possible to stabilize the viscosity of the slurry composition and also to improve the density of a positive electrode mixed material layer, and thereby sufficiently increase the capacity of a secondary battery.

<Binder Composition>

The binder composition used in the presently disclosed slurry composition is a binder composition that contains the previously described polymer A.

The proportional content of the binder composition in the slurry composition when all solid content in the slurry composition is taken to be 100 mass % is preferably an amount such that the amount of the polymer A is 0.1 parts by mass or more, and more preferably 1.0 parts by mass or more, and is preferably an amount such that the amount of the polymer A is 3.0 parts by mass or less. When the binder composition is contained in the slurry composition in an amount such that the amount of the polymer A is within any of the ranges set forth above, the peel strength of a positive electrode mixed material layer can be even further improved.

<Polymer B>

The polymer B that can optionally be contained in the presently disclosed slurry composition is a component that is contained as a binder. Any known binder such as a vinyl acetate polymer, a conjugated diene polymer, or an acrylic polymer may be used as a binder without any specific limitations so long as it is a polymer other than the previously described polymer A.

The term "vinyl acetate polymer" is inclusive of vinyl acetate homopolymers, ethylene-vinyl acetate copolymers, and polymers obtained through partial hydrolysis thereof, and the term "conjugated diene polymer" refers to a polymer that includes a conjugated diene monomer unit. Specific examples of the conjugated diene polymer include, but are not specifically limited to, copolymers that include an aromatic vinyl monomer unit and an aliphatic conjugated diene monomer unit (for example, styrene-butadiene copolymer (SBR)), butadiene rubber (BR), acrylic rubber (NBR) (copolymer including an acrylonitrile unit and a butadiene unit), styrene acrylic rubber (SNBR) (copolymer including an aromatic vinyl monomer unit, a nitrile group-containing monomer unit, an ethylenically unsaturated acid monomer unit, and a linear alkylene structural unit having a carbon number of 4 or more), and hydrogenated products of any of the preceding examples. Of these examples, acrylic rubber and styrene acrylic rubber are preferable.

The term "acrylic polymer" refers to a polymer that includes a (meth)acrylic acid ester monomer unit.

The proportional content of the polymer B relative to 100 parts by mass of the polymer A can, for example, be set as not less than 0 parts by mass and not more than 40 parts by mass.

Examples of aromatic vinyl monomer units that can be included in the conjugated diene polymer include the same aromatic vinyl monomer units as given as examples in the "Polymer A" section. Examples of aliphatic conjugated diene monomers that can form an aliphatic conjugated diene monomer unit included in the conjugated diene polymer include, but are not specifically limited to, 1,3-butadiene, 2-methyl-1,3-butadiene (isoprene), and 2,3-dimethyl-1,3-butadiene. Of these examples, 1,3-butadiene and isoprene are preferable as aliphatic conjugated diene monomers, and isoprene is more preferable as an aliphatic conjugated diene monomer. Note that one aliphatic conjugated diene monomer may be used individually, or two or more aliphatic conjugated diene monomers may be used in combination in a freely selected ratio.

The proportional content of the polymer B in the slurry composition is an amount such as to be 0.5 mass % or less, and preferably 0.3 mass % or less when all solid content in the slurry composition is taken to be 100 mass %. When the polymer B is contained such that the amount of the polymer B in the slurry composition is within any of the ranges set forth above, reduction of stability of the slurry composition containing the binder composition can be inhibited while also even further improving the peel strength of a positive electrode mixed material layer.

[Production Method of Polymer B]

No specific limitations are placed on the method by which the polymer B is produced. For example, the polymer B can be produced by any of the same methods as given as examples in the "Production method of polymer A" section.

<Other Components>

Examples of other components that can be contained in the presently disclosed slurry composition include, but are not specifically limited to, the same other components as can be contained in the presently disclosed binder composition. One other component may be used individually, or two or more other components may be used in combination in a freely selected ratio.

<Production of Slurry Composition for Non-Aqueous Secondary Battery Positive Electrode>

The presently disclosed slurry composition for a non-aqueous secondary battery positive electrode can be produced by dissolving or dispersing the above-described components in an organic solvent. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Examples of solvents that can be used to produce the slurry composition include the same solvents as can be contained in the presently disclosed binder composition. Moreover, the solvent contained in the binder composition may be used as a solvent in production of the slurry composition.

(Positive Electrode for Non-Aqueous Secondary Battery)

The presently disclosed positive electrode for a non-aqueous secondary battery includes a current collector and a positive electrode mixed material layer formed on the current collector, for example, and the positive electrode mixed material layer is formed using the presently disclosed slurry composition for a non-aqueous secondary battery positive electrode. In other words, the positive electrode mixed material layer contains at least a positive electrode active material, a conductive material, and the polymer A. In addition, the positive electrode mixed material layer can optionally contain the polymer B and the other components described above. Note that components contained in the positive electrode mixed material layer are components that were contained in the slurry composition set forth above, and the preferred ratio of these components is the same as the preferred ratio of the components in the slurry composition.

As a result of the presently disclosed positive electrode for a non-aqueous secondary battery being produced using a slurry composition that contains the presently disclosed binder composition, the presently disclosed positive electrode for a non-aqueous secondary battery can be used to cause a secondary battery to display excellent battery characteristics such as cycle characteristics.

<Production Method of Positive Electrode for Non-Aqueous Secondary Battery>

The presently disclosed positive electrode for a secondary battery can be produced, for example, through a step of applying the slurry composition set forth above onto a current collector (application step) and a step of drying the slurry composition that has been applied onto the current collector to form a positive electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the positive electrode mixed material layer to be obtained after drying.

The current collector onto which the slurry composition is applied is a material having electrical conductivity and electrochemical durability. Specifically, the current collector may be made of aluminum or an aluminum alloy. Moreover, aluminum and an aluminum alloy may be used in combination, or different types of aluminum alloys may be used in combination. Aluminum and aluminum alloys are heat resistant and electrochemically stable, and hence serve as excellent current collector materials.

[Drying Step]

The slurry composition on the current collector can be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, a positive electrode mixed material layer is formed on the current collector and thus a positive electrode for a secondary battery including the current collector and the positive electrode mixed material layer can be obtained.

After the drying step, the positive electrode mixed material layer may be further subjected to a pressing process such as mold pressing or roll pressing. The pressing process can improve close adherence between the positive electrode mixed material layer and the current collector.

(Non-Aqueous Secondary Battery)

The presently disclosed non-aqueous secondary battery includes a positive electrode, a negative electrode, a separator, and an electrolyte solution, and has the presently disclosed positive electrode for a non-aqueous secondary battery as the positive electrode. As a result of the presently disclosed non-aqueous secondary battery including the presently disclosed positive electrode for a non-aqueous secondary battery, the secondary battery can be caused to display excellent battery characteristics such as cycle characteristics.

Although the following describes, as one example, a case in which the non-aqueous secondary battery is a lithium ion secondary battery, the presently disclosed non-aqueous secondary battery is not limited to the following example.

<Negative Electrode>

A known negative electrode can be used as the negative electrode. Specifically, the negative electrode may, for example, be a negative electrode formed of a thin sheet of lithium metal or a negative electrode obtained by forming a negative electrode mixed material layer on a current collector.

The current collector may be made of a metal material such as iron, copper, aluminum, nickel, stainless steel, titanium, tantalum, gold, or platinum. The negative electrode mixed material layer may be a layer that contains a negative electrode active material and a binder. The binder is not specifically limited and may be any known material.

<Electrolyte Solution>

The electrolyte solution is normally an organic electrolyte solution obtained by dissolving a supporting electrolyte in an organic solvent. The supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable. In general, lithium ion conductivity tends to increase when a solvent having a low viscosity is used. Therefore, lithium ion conductivity can be adjusted through the type of solvent that is used.

The concentration of the electrolyte in the electrolyte solution can be adjusted as appropriate and is, for example, preferably set as 0.5 mass % to 15 mass %, more preferably set as 2 mass % to 13 mass %, and even more preferably set as 5 mass % to 10 mass %. Moreover, a known additive such as fluoroethylene carbonate or ethyl methyl sulfone may be added to the electrolyte solution.

<Separator>

Examples of the separator include separators described in JP2012-204303A. Of these separators, a microporous membrane made of polyolefinic (polyethylene, polypropylene, polybutene, or polyvinyl chloride) resin is preferred because such a membrane can reduce the total thickness of the separator, which increases the ratio of the positive electrode active material in the secondary battery, and consequently increases the volumetric capacity.

The non-aqueous secondary battery can be produced by, for example, stacking the presently disclosed positive electrode for a non-aqueous secondary battery and the negative electrode with the separator in-between, performing rolling, folding, or the like of the resultant laminate as necessary in accordance with the battery shape to place the laminate inside a battery container, injecting the electrolyte solution into the battery container, and sealing the battery container. The presently disclosed non-aqueous secondary battery may be provided with an overcurrent preventing device such as a fuse or a PTC device, an expanded metal, a lead plate, or the like as necessary in order to prevent pressure increase inside the secondary battery and the occurrence of overcharging or overdischarging. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the weight-average molecular weight (Mw), number-average molecular weight (Mn), molecular weight distribution (Mw/Mn), and degree of swelling in electrolyte solution of a polymer A, the peel strength of a positive electrode mixed material layer, and the output characteristics, cycle characteristics, and high-temperature storage characteristics of a secondary battery.

<Weight-Average Molecular Weight (Mw), Number-Average Molecular Weight (Mn), and Molecular Weight Distribution (Mw/Mn)>

A portion of a polymer A produced in each example or comparative example was sampled, and then the weight-average molecular weight (Mw) and the number-average molecular weight (Mn) of the polymer A were measured by gel permeation chromatography (GPC), and the molecular weight distribution (Mw/Mn) of the polymer A was calculated.

More specifically, the polymer A was adjusted to a solid content concentration of 0.2% and was then passed through a 0.2 μm filter. The obtained solution was then used to determine the weight-average molecular weight (Mw) and the number-average molecular weight (Mn) of the polymer A as standard polystyrene-equivalent values in a gel permeation chromatograph (HLC-8220 produced by Tosoh Corporation) using one TSK α guard column and two TSKgel α-M columns (produced by Tosoh Corporation) linked in series and using dimethylformamide with a flow rate of 1.0 mL/min as a solvent. The molecular weight distribution (Mw/Mn) was then calculated.

<Degree of Swelling in Electrolyte Solution>

An NMP dispersion containing a polymer A produced in each example or comparative example was used to form a film with a thickness of 2±0.5 mm and was then dried in a vacuum dryer at a temperature of 120° C. for 2 hours. The film was subsequently cut up and approximately 1 g thereof was precisely weighed. The obtained film piece was used as a test specimen and the mass of this film piece was taken to be W0. The film piece was immersed for 72 hours (3 days) in electrolyte solution (chemical composition: $LiPF_6$ solution of 1.0 mol in concentration (solvent: mixed solvent of ethylene carbonate and ethyl methyl carbonate having volume mixing ratio of ethylene carbonate/ethyl methyl carbonate=3/7); additive: 2 volume % (solvent ratio) of vinylene carbonate) in an environment having a temperature of 60° C. so as to cause swelling of the film piece. Thereafter, the film piece was pulled out of the electrolyte solution and the mass thereof was measured after electrolyte solution on the surface of the film piece had been gently wiped off. The mass of the swollen film piece was taken to be W1.

The degree of swelling in electrolyte solution was calculated using the following calculation formula.

Degree of swelling in electrolyte solution (%)=(W1/W0)×100

<Peel Strength of Positive Electrode Mixed Material Layer>

A positive electrode for a lithium ion secondary battery produced in each example or comparative example was cut out as a rectangle of 100 mm in length and 10 mm in width to obtain a test specimen. The test specimen was placed with the surface at which the positive electrode mixed material layer was located facing downward, and cellophane tape (tape in accordance with JIS Z1522) was affixed to the surface of the positive electrode mixed material layer. The stress when the current collector was peeled off by pulling one end of the current collector in a perpendicular direction at a speed of 100 mm/min was measured (note that the cellophane tape was secured to a test stage). Three measurements were performed in this manner, and an average value of these measurements was determined. The average value was taken to be the peel strength and was evaluated by the following standard. A larger value for the peel strength indicates that there is stronger close adherence between the positive electrode mixed material layer and the current collector and that the positive electrode mixed material layer has higher peel strength.

A: Peel strength of 40 N/m or more
B: Peel strength of not less than 30 N/m and less than 40 N/m
C: Peel strength of not less than 20 N/m and less than 30 N/m
D: Peel strength of less than 20 N/m <Output Characteristics of Secondary Battery>

A lithium ion secondary battery produced in each example or comparative example was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.20 V) and CC discharging of the lithium ion secondary battery was performed to a cell voltage of 3.00 V with a 0.2 C constant current. This charging and discharging at 0.2 C was repeated three times.

Next, the lithium ion secondary battery was subjected to 0.2 C constant-current charging and discharging between cell voltages of 4.20 V and 3.00 V in an environment having a temperature of 25° C., and the discharge capacity at this point was defined as C0. Thereafter, the lithium ion secondary battery was CC-CV charged with a 0.2 C constant current in the same manner, was then CC discharged to 3.00 V with a 2.0 C constant current in an environment having a temperature of 25° C., and the discharge capacity at this point was defined as C1. A ratio (%) of the discharge capacity (C1) at 2.0 C relative to the discharge capacity (C0) at 0.2 C, which is expressed by (C1/C0)×100(%), was determined as a capacity maintenance rate and was evaluated by the following standard. A larger value for the capacity maintenance rate indicates less reduction of discharge capacity at high current and lower internal resistance (i.e., better output characteristics).

A: Capacity maintenance rate of 75% or more
B: Capacity maintenance rate of not less than 73% and less than 75%
C: Capacity maintenance rate of not less than 70% and less than 73%
D: Capacity maintenance rate of less than 70%

<Cycle Characteristics>

Ten lithium ion secondary battery cells produced in each example or comparative example were repeatedly charged and discharged through charging to 4.3 V and discharging to 3.0 V by a 0.2 C constant-current method in an atmosphere having a temperature of 60° C., and the electric capacity thereof was measured. Taking an average value for the 10 cells as a measured value, a charge/discharge capacity retention rate expressed by the ratio (%) of the electric capacity at the end of 50 cycles and the electric capacity at the end of 5 cycles was determined and was taken to be an evaluation criterion for cycle characteristics. A higher value for the charge/discharge capacity retention rate indicates better cycle characteristics.

A: Charge/discharge capacity retention rate of 80% or more

B: Charge/discharge capacity retention rate of not less than 70% and less than 80%

C: Charge/discharge capacity retention rate of not less than 50% and less than 70%

D: Charge/discharge capacity retention rate of not less than 30% and less than 50%

<High-Temperature Storage Characteristics>

A lithium ion secondary battery produced in each example or comparative example was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.20 V) and CC discharging of the lithium ion secondary battery was performed to a cell voltage of 3.00 V with a 0.2 C constant current. This charging and discharging at 0.2 C was repeated three times. The discharge capacity in the third repetition at 0.2 C was taken to be the initial capacity Cx. The lithium ion secondary battery was subsequently CC-CV charged with a 0.2 C constant current (upper limit cell voltage 4.20 V). Next, the lithium ion secondary battery was stored for 4 weeks in an inert oven having a nitrogen atmosphere of 60° C. set inside a processing chamber. Thereafter, the lithium ion secondary battery was discharged to a cell voltage of 3.00 V by a 0.2 C constant-current method, and the discharge capacity at this point was taken to be Cy.

A high-temperature capacity maintenance rate expressed by (Cy/Cx)×100(%) was determined and was evaluated by the following standard. A larger value for the high-temperature capacity maintenance rate indicates less deterioration of the lithium ion battery during high-temperature storage (i.e., better high-temperature storage characteristics).

A: High-temperature capacity maintenance rate of 80% or more

B: High-temperature capacity maintenance rate of not less than 75% and less than 80%

C: High-temperature capacity maintenance rate of not less than 70% and less than 75%

D: High-temperature capacity maintenance rate of less than 70%

Example 1

<Production of Polymer A>

After weighing out 41.3 mg (0.25 mmol) of 2,2'-azobis (isobutyronitrile) as an azo polymerization initiator and 32.4 mg (0.13 mmol) of ethyl 2-(methyltellanyl)isobutyrate as an organotellurium compound into a glass reactor, a stirring bar was placed inside the glass reactor. Next, 300 g of dimethyl sulfoxide as an organic solvent, 95 parts (1.8 mol) of acrylonitrile as a nitrile group-containing monomer, and 1 part (11.6 mmol) of methacrylic acid as a carboxy group-containing monomer were added, the temperature of the glass reactor was raised to 60° C., and stirring was performed at 60° C. to perform a first stage polymerization reaction. The viscosity of the solution gradually increased after the start of the polymerization reaction. This polymerization reaction was continued for 15 hours to yield a block copolymer of polyacrylonitrile and methacrylic acid having a tellurium functional group at an end thereof. The glass reactor was subsequently placed in a reduced pressure state and a temperature of 60° C. was maintained for 24 hours so as to evaporate unreacted acrylonitrile.

Next, 4 parts (31.2 mmol) of n-butyl acrylate as a (meth) acrylic acid ester monomer was further added into the glass reactor, a second stage polymerization reaction was performed under stirring at a temperature of 60° C., and this polymerization reaction was continued for 24 hours to yield a dimethyl sulfoxide solution containing a block copolymer of polyacrylonitrile, methacrylic acid, and n-butyl acrylate as a polymer A.

The dimethyl sulfoxide solution containing the polymer A was coagulated in a large amount of deionized water, was washed, and was then vacuum dried at a temperature of 60° C. for 24 hours to obtain the block copolymer of polyacrylonitrile, methacrylic acid, and n-butyl acrylate as the polymer A. The yield of the obtained polymer A was 65 g (percentage yield: 65%). The weight-average molecular weight (Mw) and the molecular weight distribution (Mw/Mn) of the obtained polymer A are shown in Table 1.

<Production of Slurry Composition for Positive Electrode>

[Preliminary Mixing Step]

A preliminary mixture was obtained by adding 1 part of CNTs (specific surface area measured by BET method: 150 m$^2$/g) as a conductive material and 0.06 parts in terms of solid content of a hydrogenated acrylonitrile-butadiene rubber solution (BM720-H produced by Zeon Corporation) as a polymer B to a disper blade, further adding NMP as an organic solvent so as to adjust the solid content concentration to 4%, and performing stirred mixing at a temperature of 25±3° C. and a rotation speed of 3,000 rpm for 10 minutes.

[Main Mixing Step]

Next, 97 parts of a lithium-containing complex oxide of Co—Ni—Mn (NCM622, $LiNi_{5-10}Co_{2/10}Mn_{3/10}O_2$) as a positive electrode active material, 0.5 parts (in terms of solid content) of acetylene black (DENKA BLACK® (DENKA BLACK is a registered trademark in Japan, other countries, or both) produced by Denka Company Limited) as a conductive material, and 1.5 parts (in terms of solid content) of the polymer A adjusted to a solid content concentration of 6% with NMP were added to the preliminary mixture obtained in the preceding step, and stirred mixing was performed at a temperature of 25±3° C. and a rotation speed of 50 rpm to obtain a slurry composition for a positive electrode having a viscosity of 3,600 mPa·s as measured using a B-type viscometer under conditions of 60 rpm (M4 rotor) and 25±3° C.

<Production of Positive Electrode>

The slurry composition for a positive electrode obtained as described above was applied onto aluminum foil of 20 μm in thickness serving as a current collector by a comma coater such as to have a coating weight of 20±0.5 mg/cm$^2$.

The aluminum foil was conveyed inside an oven having a temperature of 90° C. for 2 minutes and an oven having a temperature of 110° C. for 2 minutes at a speed of 300 mm/min in order to dry the slurry composition for a positive electrode on the aluminum foil and thereby obtain a positive electrode web having a positive electrode mixed material layer formed on the current collector.

Thereafter, the positive electrode mixed material layer-side of the produced positive electrode web was roll pressed at a line pressure of 14 t (tons) in an environment having a temperature of 25±3° C. to obtain a positive electrode having a positive electrode mixed material layer density of 3.30 g/cm$^3$. The obtained positive electrode was used to evaluate the peel strength of the positive electrode mixed material layer by the previously described method. The result is shown in Table 1.

<Production of Binder Composition for Negative Electrode>

A 5 MPa pressure-resistant vessel equipped with a stirrer was charged with 65 parts of styrene, 35 parts of 1,3-butadiene, 2 parts of itaconic acid, 1 part of 2-hydroxyethyl acrylate, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator. These materials were sufficiently stirred and were then heated to a temperature of 55° C. to initiate polymerization. Cooling was performed to quench the reaction at the point at which monomer consumption reached 95.0%. A water dispersion containing a polymer that was obtained in this manner was adjusted to pH 8 through addition of 5% sodium hydroxide aqueous solution. Unreacted monomer was subsequently removed through thermal-vacuum distillation. Thereafter, cooling was performed to a temperature of 30° C. or lower to yield a water dispersion containing a binder composition for a negative electrode.

<Production of Slurry Composition for Negative Electrode>

A planetary mixer was charged with 48.75 parts of artificial graphite (theoretical capacity: 360 mAh/g) and 48.75 parts of natural graphite (theoretical capacity: 360 mAh/g) as negative electrode active materials and 1 part in terms of solid content of carboxymethyl cellulose as a thickener. These materials were diluted to a solid content concentration of 60% with deionized water and were subsequently kneaded at a rotation speed of 45 rpm for 60 minutes. Thereafter, 1.5 parts in terms of solid content of the binder composition for a negative electrode obtained as described above was loaded into the planetary mixer and was kneaded at a rotation speed of 40 rpm for 40 minutes. In addition, deionized water was added to adjust the viscosity to 3,000±500 mPa·s (measured by B-type viscometer at 25° C. and 60 rpm) and thereby produce a slurry composition for a negative electrode.

<Production of Negative Electrode>

The slurry composition for a negative electrode was applied onto the surface of copper foil of 15 μm in thickness serving as a current collector by a comma coater such as to have a coating weight of 11±0.5 mg/cm$^2$. The copper foil with the slurry composition for a negative electrode applied thereon was subsequently conveyed inside an oven having a temperature of 80° C. for 2 minutes and inside an oven having a temperature of 110° C. for 2 minutes at a speed of 400 mm/min in order to dry the slurry composition for a negative electrode on the copper foil and thereby obtain a negative electrode web having a negative electrode mixed material layer formed on the current collector.

Thereafter, the negative electrode mixed material layer-side of the produced negative electrode web was roll pressed at a line pressure of 11 t (tons) in an environment having a temperature of 25±3° C. to obtain a negative electrode having a negative electrode mixed material layer density of 1.60 g/cm$^3$.

<Preparation of Separator for Secondary Battery>

A separator made of a single layer of polypropylene (#2500 produced by Celgard, LLC.) was used.

<Production of Lithium Ion Secondary Battery>

The negative electrode, positive electrode, and separator described above were used to produce a single-layer laminate cell (initial design discharge capacity: equivalent to 40 mAh) and were placed inside aluminum packing. The aluminum packing was subsequently filled with a LiPF$_6$ solution of 1.0 M in concentration (solvent: mixed solvent of ethylene carbonate (EC)/ethyl methyl carbonate (EMC)=3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery.

The lithium ion secondary battery was used to evaluate output characteristics, cycle characteristics, and high-temperature storage characteristics as previously described. The results are shown in Table 1.

Example 2

A slurry composition for a positive electrode, a positive electrode, a binder composition for a negative electrode, a slurry composition for a negative electrode, a negative electrode, and a lithium ion secondary battery were produced in the same way as in Example 1 with the exception that 4 parts of styrene as an aromatic vinyl monomer was used instead of n-butyl acrylate as a (meth)acrylic acid ester monomer in production of the polymer A. Various measurements and evaluations were performed in the same way as in Example 1. The results are shown in Table 1.

Example 3

A slurry composition for a positive electrode, a positive electrode, a binder composition for a negative electrode, a slurry composition for a negative electrode, a negative electrode, and a lithium ion secondary battery were produced in the same way as in Example 1 with the exception that 4 parts of 2-ethylhexyl acrylate was used instead of n-butyl acrylate as a (meth)acrylic acid ester monomer in production of the polymer A. Various measurements and evaluations were performed in the same way as in Example 1. The results are shown in Table 1.

Example 4

A slurry composition for a positive electrode, a positive electrode, a binder composition for a negative electrode, a slurry composition for a negative electrode, a negative electrode, and a lithium ion secondary battery were produced in the same way as in Example 1 with the exception that 1 part of acrylic acid was used instead of methacrylic acid as a carboxy group-containing monomer and 4 parts of acrylamide as a (meth)acrylamide monomer was used instead of n-butyl acrylate as a (meth)acrylic acid ester monomer in production of the polymer A. Various measurements and evaluations were performed in the same way as in Example 1. The results are shown in Table 1.

Example 5

A slurry composition for a positive electrode, a positive electrode, a binder composition for a negative electrode, a slurry composition for a negative electrode, a negative electrode, and a lithium ion secondary battery were produced in the same way as in Example 1 with the exception that the amount of acrylonitrile as a nitrile group-containing monomer was changed to 82 parts and the amount of n-butyl acrylate as a (meth)acrylic acid ester monomer was changed to 17 parts in production of the polymer A. Various measurements and evaluations were performed in the same way as in Example 1. The results are shown in Table 1.

Example 6

A slurry composition for a positive electrode, a positive electrode, a binder composition for a negative electrode, a slurry composition for a negative electrode, a negative electrode, and a lithium ion secondary battery were produced in the same way as in Example 1 with the exception that the reaction temperature was set as 40° C. and the reaction time was set as 15 hours in production of the polymer A. Various measurements and evaluations were performed in the same way as in Example 1. The results are shown in Table 1.

Example 7

A slurry composition for a positive electrode, a positive electrode, a binder composition for a negative electrode, a slurry composition for a negative electrode, a negative electrode, and a lithium ion secondary battery were produced in the same way as in Example 1 with the exception that the reaction temperature was set as 65° C. and the reaction time was set as 20 hours in production of the polymer A. Various measurements and evaluations were performed in the same way as in Example 1. The results are shown in Table 1.

Example 8

A slurry composition for a positive electrode, a positive electrode, a binder composition for a negative electrode, a slurry composition for a negative electrode, a negative electrode, and a lithium ion secondary battery were produced in the same way as in Example 3 with the exception that the amount of acrylonitrile as a nitrile group was changed to 80 parts and the amount of 2-ethylhexyl acrylate as a (meth)acrylic acid ester monomer was changed to 19 parts in production of the polymer A. Various measurements and evaluations were performed in the same way as in Example 1. The results are shown in Table 1.

Example 9

A slurry composition for a positive electrode, a positive electrode, a binder composition for a negative electrode, a slurry composition for a negative electrode, a negative electrode, and a lithium ion secondary battery were produced in the same way as in Example 1 with the exception that methacrylic acid as a carboxy group-containing monomer was not used and the amount of n-butyl acrylate as a (meth)acrylic acid ester monomer was changed to 5 parts in production of the polymer A. Various measurements and evaluations were performed in the same way as in Example 1. The results are shown in Table 1.

Comparative Example 1

A slurry composition for a positive electrode, a positive electrode, a binder composition for a negative electrode, a slurry composition for a negative electrode, a negative electrode, and a lithium ion secondary battery were produced in the same way as in Example 1 with the exception that a polymer A produced as described below was used. Various measurements and evaluations were performed in the same way as in Example 1. The results are shown in Table 2.

<Production of Polymer A>

A pressure-resistant vessel equipped with a stirrer, a thermometer, a condenser, and a nitrogen gas feeding tube was charged with 400 parts of deionized water. Depressurization (−600 mmHg) and restoration to normal pressure with nitrogen gas were repeated three times while slowly rotating the stirrer. Next, a dissolved oxygen meter was used to confirm that the oxygen concentration in the gas phase portion of the reactor was 1% or less and that dissolved oxygen in the water was 1 ppm or less. Thereafter, 0.2 parts of partially saponified polyvinyl alcohol (GOHSENOL GH-20 produced by The Nippon Synthetic Chemical Industry Co., Ltd.; degree of saponification: 86.5 mol % to 89.0 mol %) as a dispersant was gradually added and was thoroughly dispersed. The temperature was gradually raised to 60° C. while continuing stirring and was maintained at 60° C. for 30 minutes so as to dissolve the partially saponified polyvinyl alcohol.

Under conditions of a nitrogen gas ventilation rate of 0.5 mL/min, 85 parts of acrylonitrile as a nitrile group-containing monomer, 5 parts of methacrylic acid as a carboxy group-containing monomer, and 0.2 parts of t-dodecyl mercaptan as a molecular weight modifier were loaded into the vessel, were mixed by stirring, and were held at 60±2° C. Next, a solution of 0.4 parts of 1,1-azobis(1-acetoxy-1-phenylethane) (OTAZO-15 produced by Otsuka Chemical Company Limited), which is an oil-soluble polymerization initiator, dissolved in 10 parts of acrylonitrile, which is a nitrile group-containing monomer, was added so as to initiate a reaction. The reaction was caused to progress at 60±2° C. for 3 hours, was subsequently continued at 70±2° C. for 2 hours, and was then caused to progress at 80±2° C. for 2 hours. Cooling was subsequently performed to 40° C. or lower to yield polymer particles. The obtained polymer particles were collected on 200-mesh filter cloth, were washed three times with 100 parts of deionized water, and were subsequently vacuum dried at 70° C. for 12 hours so as to perform isolation and purification to yield a polymer A.

Comparative Example 2

A slurry composition for a positive electrode, a positive electrode, a binder composition for a negative electrode, a slurry composition for a negative electrode, a negative electrode, and a lithium ion secondary battery were produced in the same way as in Example 1 with the exception that the amount of an acrylonitrile as a nitrile group-containing monomer was changed to 60 parts, methacrylic acid as a carboxy group-containing monomer was not used, and the amount of n-butyl acrylate as a (meth)acrylic acid ester monomer was changed to 40 parts in production of the polymer A. Various measurements and evaluations were performed in the same way as in Example 1. The results are shown in Table 2.

Comparative Example 3

A slurry composition for a positive electrode, a positive electrode, a binder composition for a negative electrode, a slurry composition for a negative electrode, a negative electrode, and a lithium ion secondary battery were produced in the same way as in Comparative Example 2 with the exception that the amount of acrylonitrile as a nitrile group-containing monomer was changed to 80 parts and the amount of n-butyl acrylate as a (meth)acrylic acid ester monomer was changed to 20 parts in production of the polymer A. Various measurements and evaluations were performed in the same way as in Example 1. The results are shown in Table 2.

In Table 1, shown below:
"AN" indicates acrylonitrile;
"MAA" indicates methacrylic acid;
"AA" indicates acrylic acid;
"BA" indicates n-butyl acrylate;
"2-EHA" indicates 2-ethylhexyl acrylate;
"ST" indicates styrene;
"Aam" indicates acrylamide;
"CNT" indicates carbon nanotubes;
"AceB" indicates acetylene black; and
"NCM" indicates lithium-containing complex oxide of Co—Ni—Mn as positive electrode active material.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Slurry composition for non-aqueous secondary battery positive electrode | Polymer A | Chemical composition | Nitrile group-containing monomer unit | Type | AN | AN | AN | AN | AN | AN | AN | AN | AN |
| | | | | [Mass %] | 95 | 95 | 95 | 95 | 82 | 95 | 95 | 80 | 95 |
| | | | Carboxy group-containing monomer unit | Type | MAA | MAA | MAA | AA | MAA | MAA | MAA | MAA | — |
| | | | | [Mass %] | 1 | 1 | 1 | 1 | 1 | 1 | 1 | 1 | — |
| | | | (Meth)acrylic acid ester monomer unit | Type | BA | — | 2-EHA | — | BA | BA | BA | 2-EHA | BA |
| | | | | [Mass %] | 4 | — | 4 | — | 17 | 4 | 4 | 19 | 5 |
| | | | Other monomer units | Type | — | ST | — | Aam | — | — | — | — | — |
| | | | | [Mass %] | — | 4 | — | 4 | — | — | — | — | — |
| | | Weight-average molecular weight (Mw) | | | 1,000,000 | 1,000,000 | 1,000,000 | 1,000,000 | 1,000,000 | 800,000 | 1,800,000 | 1,000,000 | 1,000,000 |
| | | Molecular weight distribution (Mw/Mn) | | | 1.8 | 1.8 | 1.8 | 1.8 | 1.8 | 1.5 | 2.3 | 2.0 | 2.0 |
| | | Degree of swelling in electrolyte solution [mass %] | | | 150 | 140 | 170 | 150 | 180 | 150 | 150 | 240 | 150 |
| | | Amount (in terms of solid content) [parts by mass] | | | 1.5 | 1.5 | 1.5 | 1.5 | 1.5 | 1.5 | 1.5 | 1.5 | 1.5 |
| | Conductive material | | | Type | CNT/AceB | CNT/AceB | CNT/AceB | CNT/AceB | CNT/AceB | CNT/AceB | CNT/AceB | CNT/AceB | CNT/AceB |
| | | | | Amount [parts by mass] | 1.5 | 1.5 | 1.5 | 1.5 | 1.5 | 1.5 | 1.5 | 1.5 | 1.5 |
| | Positive electrode active material | | | Type | NCM | NCM | NCM | NCM | NCM | NCM | NCM | NCM | NCM |
| | | | | Amount [parts by mass] | 97 | 97 | 97 | 97 | 97 | 97 | 97 | 97 | 97 |
| Evaluation | Peel strength | | | | A | B | B | A | A | B | B | B | B |
| | Output characteristics | | | | A | A | B | B | B | A | A | C | A |
| | Cycle characteristics | | | | A | A | B | B | A | A | B | B | A |
| | High-temperature storage characteristics | | | | A | A | A | A | B | A | A | B | A |

TABLE 2

| | | | | | Comparative Example 1 | Comparative Example 2 | Comparative Example 3 |
|---|---|---|---|---|---|---|---|
| Slurry composition for non-aqueous secondary battery positive electrode | Polymer A | Chemical composition | Nitrile group-containing monomer unit | Type | AN | AN | AN |
| | | | | [Mass %] | 95 | 60 | 80 |
| | | | Carboxy group-containing monomer unit | Type | MAA | — | — |
| | | | | [Mass %] | 5 | — | — |
| | | | (Meth)acrylic acid ester monomer unit | Type | — | BA | BA |
| | | | | [Mass %] | — | 40 | 20 |
| | | | Other monomer units | Type | — | — | — |
| | | | | [Mass %] | — | — | — |
| | | Weight-average molecular weight (Mw) | | | 1,300,000 | 1,000,000 | 500,000 |
| | | Molecular weight distribution (Mw/Mn) | | | 8.0 | 2.0 | 2.0 |
| | | Degree of swelling in electrolyte solution [mass %] | | | 150 | 350 | 180 |
| | | Amount (in terms of solid content) [parts by mass] | | | 1.5 | 1.5 | 1.5 |
| | Conductive material | | | Type | CNT/AceB | CNT/AceB | CNT/AceB |
| | | | | Amount [parts by mass] | 1.5 | 1.5 | 1.5 |
| | Positive electrode active material | | | Type | NCM | NCM | NCM |
| | | | | Amount [parts by mass] | 97 | 97 | 97 |
| Evaluation | | | | Peel strength | D | B | D |
| | | | | Output characteristics | C | D | C |
| | | | | Cycle characteristics | A | D | B |
| | | | | High-temperature storage characteristics | B | D | C |

It can be seen from Table 1 that in Examples 1 to 9 in which the used binder composition contained a polymer A that included a nitrile group-containing monomer unit in a proportion within a specific range of not less than 80.0 mass % and not more than 99.9 mass %, that had a weight-average molecular weight (Mw) within a specific range of not less than 700,000 and not more than 2,000,000, and that had a molecular weight distribution (Mw/Mn) of a specific value of less than 3.0, it was possible to increase the peel strength of a positive electrode mixed material layer and to enhance the output characteristics, cycle characteristics, and high-temperature storage characteristics of a secondary battery.

Moreover, it can be seen from Table 2 that although the cycle characteristics of a secondary battery could be enhanced in Comparative Example 1 in which the molecular weight distribution (Mw/Mn) of the polymer A exceeded the specific molecular weight distribution set forth above, it was not possible to increase the peel strength of a positive electrode mixed material layer.

It can also be seen from Table 2 that although the peel strength of an electrode mixed material layer could be increased in Comparative Example 2 in which the proportion in which a nitrile group-containing monomer unit was included in the polymer A was outside of the specific range set forth above, it was not possible to enhance the output characteristics, cycle characteristics, and high-temperature storage characteristics of a secondary battery.

It can also be seen from Table 2 that although the cycle characteristics of a secondary battery could be enhanced in Comparative Example 3 in which the weight-average molecular weight of the polymer A was outside of the specific range set forth above, it was not possible to increase the peel strength of a positive electrode mixed material layer and to enhance the output characteristics and high-temperature storage characteristics of the secondary battery.

INDUSTRIAL APPLICABILITY

According to the present disclosure, it is possible to provide a binder composition for a non-aqueous secondary battery electrode and a slurry composition for a non-aqueous secondary battery positive electrode that can form an electrode mixed material layer having excellent peel strength and can cause a non-aqueous secondary battery to display good cycle characteristics.

Moreover, according to the present disclosure, it is possible to provide a positive electrode for a non-aqueous secondary battery that has excellent positive electrode mixed material layer peel strength and can cause a non-aqueous secondary battery to display good cycle characteristics.

Furthermore, according to the present disclosure, it is possible to provide a non-aqueous secondary battery having excellent battery characteristics such as cycle characteristics.

The invention claimed is:

1. A binder composition for a non-aqueous secondary battery electrode comprising a polymer A, wherein
   the polymer A includes a nitrile group-containing monomer unit in a proportion of not less than 80.0 mass % and not more than 99.9 mass %,
   the polymer A has a weight-average molecular weight (Mw) of not less than 700,000 and not more than 2,000,000,
   the polymer A has a molecular weight distribution (Mw/Mn) of less than 3.0,
   the polymer A further includes either one or both of a carboxy group-containing monomer unit and a (meth)acrylic acid ester monomer unit, and
   a proportional content of other monomer units in the polymer A is 0 mass %.

2. The binder composition for a non-aqueous secondary battery electrode according to claim 1, wherein
   the polymer A has a degree of swelling in electrolyte solution of not less than 120 mass % and not more than 250 mass %,
   the degree of swelling in electrolyte solution being calculated by (W1/W0)×100 using mass W0 of a test specimen produced by drying an N-methyl-2-pyrrolidone dispersion of the polymer A under conditions of 2 hours at a temperature of 120° C. and mass W1 of the test specimen after 72 hours of immersion in electrolyte solution at a temperature of 60° C., and
   the electrolyte solution being a solution in which $LiPF_6$ is dissolved in a concentration of 1.0 mol/L in a mixed solvent of ethylene carbonate and ethyl methyl carbonate having a volume mixing ratio of ethylene carbonate/ethyl methyl carbonate=3/7.

3. A slurry composition for a non-aqueous secondary battery positive electrode comprising: a positive electrode active material; a conductive material; and the binder composition for a non-aqueous secondary battery electrode according to claim 1.

4. A positive electrode for a non-aqueous secondary battery comprising a positive electrode mixed material layer formed using the slurry composition for a non-aqueous secondary battery positive electrode according to claim 3.

5. A non-aqueous secondary battery comprising a positive electrode, a negative electrode, a separator, and an electrolyte solution, wherein the positive electrode is the positive electrode for a non-aqueous secondary battery according to claim 4.

* * * * *